US006947543B2

(12) United States Patent
Alvarado et al.

(10) Patent No.: US 6,947,543 B2
(45) Date of Patent: Sep. 20, 2005

(54) COMPUTER-TELEPHONY INTEGRATION THAT USES FEATURES OF AN AUTOMATIC CALL DISTRIBUTION SYSTEM

(75) Inventors: Joaquin Omar Alvarado, Eatontown, NJ (US); Didina Burok, Matawan, NJ (US); Andrew D. Flockhart, Thornton, CO (US); Eugene P. Mathews, Barrington, IL (US); Peter J. Matteo, Eatontown, NJ (US); Christopher Moss, Flower Mound, TX (US); Robert Daniel Nalbone, Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 333 days.

(21) Appl. No.: 10/037,779

(22) Filed: Jan. 3, 2002

(65) Prior Publication Data

US 2003/0123642 A1 Jul. 3, 2003

(51) Int. Cl.[7] .............................. H04M 3/00; H04M 5/00
(52) U.S. Cl. ............................ 379/266.01; 379/265.13
(58) Field of Search .................. 379/265.02–265.05, 379/265.09, 265.12, 266.01, 266.02, 266.07, 309

(56) References Cited

U.S. PATENT DOCUMENTS 5,991,392 A * 11/1999 Miloslavsky ........... 379/265.02
6,122,365 A 9/2000 Yegoshin
6,137,862 A 10/2000 Atkinson et al.
6,681,010 B1 * 1/2004 Anderson et al. ...... 379/265.11
2003/0026414 A1 * 2/2003 Baker et al. ........... 379/265.13
2003/0095652 A1 * 5/2003 Mengshoel et al. .... 379/265.06

FOREIGN PATENT DOCUMENTS

WO        WO 01/13606 A1      2/2001

OTHER PUBLICATIONS

EP Appl. No. 02254941.4, EPO Office Action dated Mar. 24, 2004.

* cited by examiner

Primary Examiner—Benny Tieu
(74) Attorney, Agent, or Firm—David Volejnicek

(57) ABSTRACT

In a computer-telephony integrated (CTI) contact center, a CTI adjunct (160) enqueues contacts in contact queues (184) of the CTI adjunct, but also causes contacts that are calls (168) to be enqueued as ACD calls in ACD call queues (120) of an ACD system (101), whereby the ACD system and its management information system (MIS 110) provide ACD features to the calls. Similarly, the CTI adjunct enqueues agents in agent queues (185) of the CTI adjunct, but also causes agents (102–104) that have call-handling skills to log into and to be enqueued as ACD agents in ACD agent queues (130) of the ACD system, whereby the ACD system and its MIS provide ACD features to the agents.

35 Claims, 7 Drawing Sheets

COMPUTER-TELEPHONY INTEGRATION THAT USES FEATURES OF AN AUTOMATIC CALL DISTRIBUTION SYSTEM

CROSS-REFERENCE TO A RELATED APPLICATION

This application shares a common disclosure with an application of J. O. Alvarado et al. entitled "Uninterrupted Automatic Call Distribution During Failure and Recovery of Computer-Telephony Integration," U.S. application Ser. No. 10/037,274, filed on even date herewith and assigned to the same assignee.

TECHNICAL FIELD

This invention relates to automatic call distribution systems and to computer-telephony integration therewith.

BACKGROUND OF THE INVENTION

Automatic call distribution (ACD) systems distribute calls for servicing in a call center among a group of agents, based on various criteria such as availability and skills of the agents and needs of the callers. An ACD system detects and answers incoming calls. It looks in its memory for instructions on what to do with the calls. Based on these instructions it enqueues each call in a call queue that corresponds to the call's type and gives the calls some "in-queue" treatment, such as messages indicating that someone will answer the call shortly and how long the caller is likely to wait for an answer, and/or connects the calls to a voice-response unit to collect more information about the calls. When a call reaches the head of its call queue and an agent who services this type of calls becomes available, the ACD system connects the call to that agent for servicing. Many sophisticated ACD systems provide a variety of additional features as well.

An ACD system typically has an associated management information system (MIS). The MIS collects valuable information about the calls and the call center's performance. The collected information may include information on when, how many, on which lines, and from where calls arrived, how many callers were put on hold, how many on-hold callers abandoned their calls prior to being serviced, and information on the originations and logical destinations of calls such as ANI and DNIS. Many sophisticated MISs gather a variety of additional information as well.

Computer-telephony integration (CTI) applies additional computer intelligence to the making, receiving, and managing of calls. CTI involves connecting a host (adjunct) computer to a telephone switch, such as an ACD or a private branch exchange, and having the computer issue commands to the switch to distribute the calls to the agents. At the same time, the computer usually retrieves stored data relating to the calls (or, more precisely, to the callers) and displays the retrieved data on display screens of the agents to whom the calls are sent for servicing. In a multi-media call center that also services contacts (communications) other than calls, such as e-mail, Internet messages, faxes, etc., the host computer manages these contacts akin to how the ACD system manages calls, and integrates management and servicing of calls with the management and servicing of the other contacts.

ACD systems and MISs have been refined over decades of development to provide extensive sets of sophisticated features and data-gathering capabilities. An unfortunate characteristic of conventional CTI is that the CTI host assumes complete control over the ACD system and makes the ACD system and its MIS "dumb". For example, calls incoming to the ACD system are "parked" by the ACD system and are routed to agent extensions as extension calls and not as ACD calls. Call treatment while waiting for an agent to become available is thus very limited. The number of calls waiting to be routed to available agents can be very capacity-constrained. Because calls are not treated as ACD calls, the ACD switch's numerous ACD features can no longer be used. Because calls are not queued to ACD queues on the ACD switch, and because agents do not log into the ACD switch, the ACD switch's MIS system can no longer provide measurements or reports of value. Meanwhile, the CTI host's MIS system cannot be as complete as the ACD's MIS system, because rarely does a CTI host receive notification of every event that an MIS system would need. The customer's considerable investment in ACD products and infrastructure is therefore largely thrown away when transitioning to conventional CTI. In other words, the features of the ACD system and the MIS are no longer accessed and used; if they are wanted, they must be re-implemented on the CTI host. This is clearly duplicative and wasteful of the large effort that was expended in providing these features and capabilities in the ACD system and its MIS.

SUMMARY OF THE INVENTION

This invention is directed to solving these and other problems and disadvantages of the prior art. Illustratively according to the invention, the CTI host causes contacts that are calls to be enqueued as ACD calls in the ACD system, whereby the ACD system and its MIS provide ACD features to the calls. Similarly, agents with call-handling skills log into the ACD system and the CTI host causes these agents to be enqueued as ACD agents in the ACD system, whereby the ACD system and its MIS provide ACD features to these agents.

Specifically according to the invention, a method of operating a contact center that comprises an automatic call distribution (ACD) system and a host processor (e.g., a CTI host) separate from the ACD system comprises the following functions. The host processor enqueues a received contact in a contact queue of the host processor at least if the contact is not a call. Illustratively, the host processor enqueues any received contact in a contact queue of the host processor. If the contact is a call, the host processor also causes the ACD system to enqueue the received call as an ACD call in a selected one of a plurality of call queues of the ACD system, and the ACD system does so in response. The ACD system and preferably also its MIS system then treat the call as any other ACD call and provide ACD features thereto. The host processor dequeues the contact and assigns the contact to an agent for servicing at least if the contact is not a call. Illustratively, the host processor dequeues any contact from a contact queue of the host processor, and assigns the contact to an agent for servicing if the contact is not a call. If the contact is a call, the host processor causes the ACD system to assign the contact to a selected one of a plurality of ACD agents, and in response the ACD system dequeues the call from the selected one of its ACD call queues and sends the call to the selected one of the ACD agents for servicing.

Similarly, the host processor enqueues an agent in an agent queue of the host processor at least if the agent is not an ACD agent. Illustratively, the host processor enqueues any agent in an agent queue of the host processor. If the agent is an ACD agent (e.g., if the agent has a call-handling skill), the host processor also causes the ACD system to enqueue the agent as an ACD agent in a selected agent queue of the ACD system, and the ACD system does so in response. The ACD system and preferably also its MIS system then treat the agent as any other ACD agent and provide ACD features thereto. The host processor dequeues the agent and assigns the agent to service a contact at least if the agent is not an ACD agent. Illustratively, the host processor dequeues any agent from an agent queue of the host processor, and assigns the agent to service a contact if the agent is not an ACD agent. If the agent is an ACD agent, the host processor causes the ACD system to assign the agent to service an ACD call, and in response the ACD system dequeues the agent from the selected one of its ACD agent queues and sends a call to the agent for servicing.

Advantageously, the host processor provides services to non-call contacts and provides enhanced services to all contacts, but does so in a manner that allows much of the intrinsic value of the ACD system and its MIS to be preserved for calls. Calls are queued "logically" on the host processor, but are also queued "physically" in the ACD call queues. Agents log into and are enqueued on the host processor; ACD agents also log into and are enqueued on the ACD system as in a regular ACD configuration. The host processor assumes control of the allocation of calls to agents, but does so with minimal disruption to the ACD system. The ACD system continues to perform exactly as before, with the exception that it no longer allocates calls to agents and vice versa, when these calls are under control of the host processor. With the exception of the allocation decisions, all audible, visual, monitoring, reporting, and control capabilities supported by the ACD system and its MIS continue as in standard stand-alone ACD operation. The host processor can focus on providing enhanced services and no longer is required to recreate the services that are already present in the ACD system. The ACD system is not made dumb, but continues to operate as a smart switch. The host processor's enhanced services are enabled while, at the same time, the value of the customers' considerable investment in existing products and infrastructure is preserved.

While the invention has been characterized in terms of a method, it also encompasses apparatus that performs the method. The apparatus preferably includes an effecter—any entity that effects the corresponding step, unlike a means—for each step. The invention further encompasses any computer-readable medium containing instructions which, when executed in a computer, cause the computer to perform the method steps.

These and other features and advantages of the present invention will become more apparent from the following description of an illustrative embodiment of the invention considered together with the drawing.

DETAILED DESCRIPTION

Figure 1:
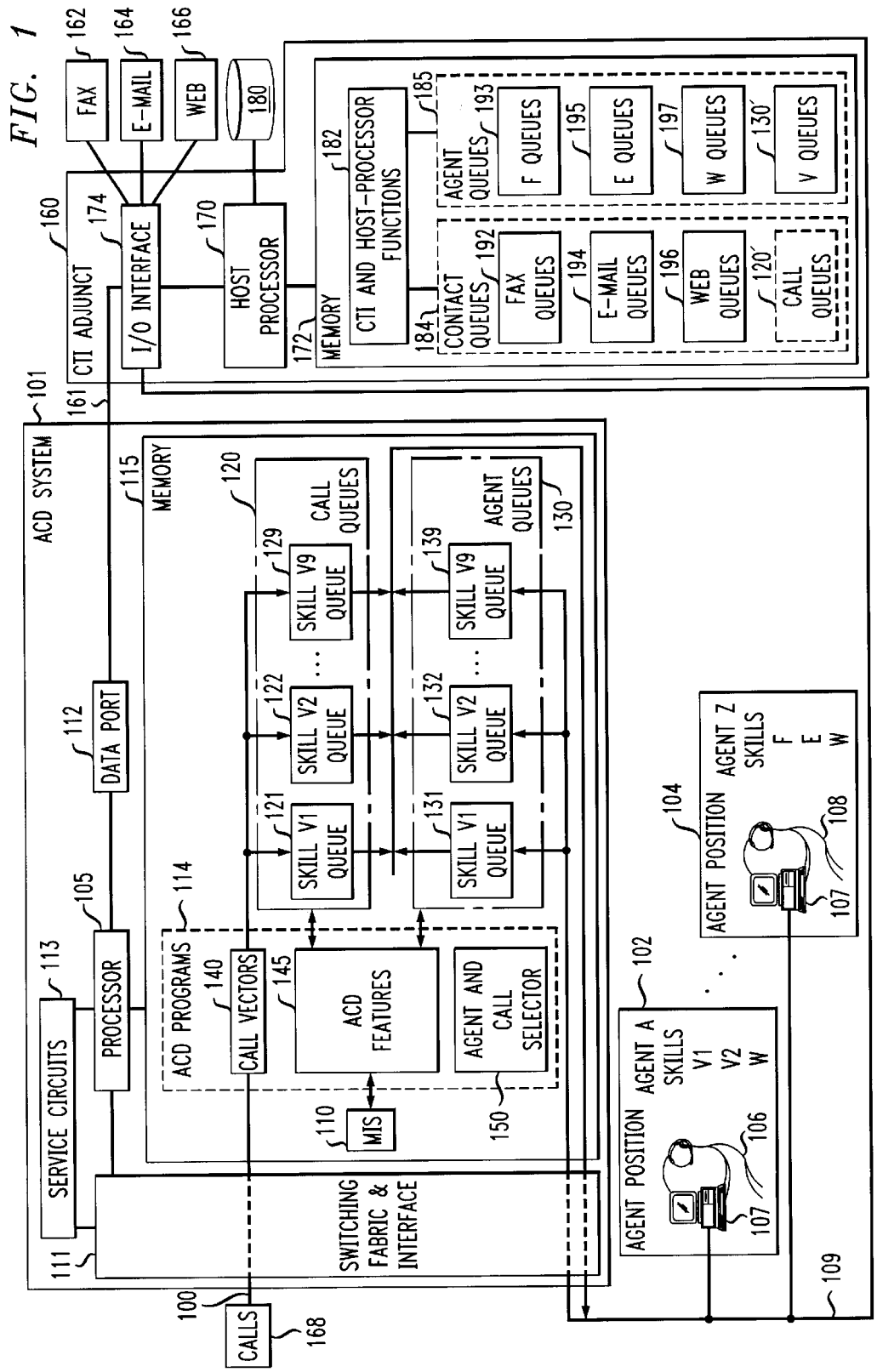
FIG. 1 is a block diagram of a multi-media contact center that includes an illustrative embodiment of the invention.

FIG. 1 shows an illustrative multi-media contact center. The contact center comprises a plurality of telephone lines and/or trunks 100 over which it receives or generates telephone calls 168. Lines and/or trunks 100 are selectively interconnected with a plurality of agent positions 102–104 via an ACD system 101. Each agent position 102–104 includes a voice-and-data terminal 107 for use by a corresponding agent 106–108 in handling calls and other contacts. Terminals 107 are connected to ACD system 101 by a voice-and-data transmission medium 109. Included in ACD system 101 is a conventional management information system (MIS) 110 that monitors ACD calls and ACD agents and gathers call and agent records and statistics for use in managing ACD system 101 and in generating reports.

ACD system 101 is illustratively the Avaya Inc. Definity® private-branch exchange (PBX)-based ACD system. It is a stored-program-controlled system that conventionally includes a communications switching fabric and interfaces (ports) 111 to external communications links 100 and 109, service circuits 113 (e.g., tone generators, announcement circuits, interactive voice response systems, etc.), a computer-readable medium such as memory 115 for storing ACD control programs 114 and data, and a processor 105 (i.e., a computer) for executing the stored ACD control programs and using the data to control the fabric and interfaces 111 and service circuits 113 to provide automatic call-distribution functionality and features. Included among the data stored in memory 115 are a set of ACD call queues 120 and a set of ACD agent queues 130. Each call queue 121–129 corresponds to a different agent skill (V1–V9) for servicing voice (V) calls, as does each agent queue 131–139. Included among ACD control programs 114 in memory 115 are call vectors 140. In conventional ACD system 101 operation, ACD calls 168 incoming on lines or trunks 100 are assigned by call vectors 140 to different call queues 121–129 based upon the agent skill that they require for their proper handling. ACD agents 106–108 who are available for handling calls are assigned to agent queues 131–139 based upon the skills which they posses. An agent may have multiple skills, and hence may be assigned to multiple agent queues 131–139 simultaneously. Also included among ACD control programs 114 in memory 115 is an agent and call selector 150. In conventional ACD system 101 operation, selector 150 effects an assignment between available calls 168 and agents 106–108 available to service the calls in a way that tends to optimize the operation of ACD system 101. For example, selector 150 tends to optimize in-queue wait times for calls. Further included among ACD control programs 114 in memory 115 are ACD features 145 which use service circuits 113 to provide a rich array of features to ACD calls and agents, such as data collection, announcement messages and tones, etc.

As described so far, the contact center of FIG. 1 constitutes a call center for handling ACD telephone calls 168. However, the multi-media contact center further includes a CTI adjunct 160 that integrates other types of contacts, such as fax 162, e-mail 164, and Web messaging 166, into the contact center to turn it into a multi-media contact center. CTI adjunct 160 connects to sources of the other contacts 162–166 via conventional input and output (I/O) interfaces 174. CTI adjunct 160 is a stored-program controlled machine: it includes a computer-readable medium such as memory 172 that stores control programs and data and one or more host processors 170 that execute programs out of memory 172 and use data from memory 172 and from an external database 180. Host processor 170 is connected by I/O interfaces 174 to a CTI link 161 and thereby to ACD system 101. CTI link 161 connects through a data port 112 of ACD system 101 to processor 105 of ACD system 101. Host processor 170 receives call-related data and exerts CTI control over ACD system 101 through CTI link 161. Host processor 170 is also connected by I/O interfaces 174 to transmission medium 109, by means of which it connects the other contacts 162–166 to agent positions 102–104 for servicing by agents 106–108, supplies data from database 180 to agent positions 102–104 for display on terminals 107, and receives data from terminals 105 of agent positions 102–104 for storage in database 180. CTI adjunct is illustratively the CRM Central product of Avaya Inc.

While only one processor 170 is shown in FIG. 1 for simplicity, typically two or more cooperating processors would be employed, one to perform CTI functions and the others to perform work-allocation functions.

Included among the control programs in memory 172 of CTI adjunct 160 are CTI and work-allocation functions 182. Functions 182 effect functionality that parallels and replaces the call-routing functionality of call vector 140 and agent and call selector 150 of ACD system 101 for calls 168 and for the other contacts 162–166 as well. Functions 182 implement contact queues 184 and agent queues 185 in memory 172. Contact queues 184 parallel call queues 120 for contacts 162–168. Contact queues 184 include fax queues 192 for fax contacts 162, e-mail queues 194 for e-mail contacts 164, Web message queues 196 for Web contacts 166, and call queues 120' for telephone calls 168. Call queues 120' duplicate call queues 120 of ACD system 101. As is the case with calls 168, which may be categorized and enqueued by call vectors 140 of ACD system 101 in different call queues 121–129 according to the skills that are needed for their servicing, contacts 162–168 may be similarly categorized and enqueued by function 182 of CTI adjunct 160. Hence, each of queues 192–196 and 120' may include a plurality of queues each corresponding to a different skill. Thus, just as there are a plurality of queues 121'–129' in call queues 120' each corresponding to a different voice skill (V), there may be a plurality of fax queues 192 each corresponding to a different fax skill (F), a plurality of e-mail queues 194 each corresponding to a different e-mail skill (E), and a plurality of Web queues 196 each corresponding to a different Web skill (W). Agent queues 185 parallel agent queues 130 for contacts 162–168. Agent queues 185 include queues 193 for agents with fax skills (F), queues 195 for agents with e-mail skills (E), queues 197 for agents with Web skills (W), and queues 130' for agents with voice skills (V). Agent queues 130' duplicate agent queues 130 of ACD system 101. Normally, there is one agent queue 185 for each contact queue 184. An agent 106–108 may possess a plurality of skills and therefore may be enqueued when idle in a plurality of agent queues 185. Functions 182 illustratively comprise the Enterprise Advocate product of Avaya Inc.

The operation of the multi-media contact center of FIG. 1 is shown in FIGS. 2–5. During normal operation of the contact center, agent and call selector 150 of ACD system 101 is turned off (disabled) and call vectors 140 are disabled from making routing decisions. When a new call 168 arrives at ACD system 101, at step 200 of FIG. 2, an incoming call vector 140 detects its arrival and conventionally "parks" the call, at step 202. Incoming call vector 140 also notifies CTI adjunct 160 via CTI link 161 of the call and requests routing instructions from CTI adjunct 160, at step 204. Host processor 170 is notified of the arrival of any new contacts 162–168, at step 206, be they calls, faxes, e-mails, or Web messages. Host processor 170 analyzes the arrived contact to determine its type and what servicing the contact demands, at step 208. The analysis illustratively duplicates that which is normally performed for ACD calls by call vectors 140 to determine what skill the call requires for its servicing. If the contact is not a new call 168, as determined at step 210, on the basis of its analysis, host processor 170 checks the appropriate one of agent queues 185 to determine if a suitable agent 106–108 is available, at step 212. If a suitable agent is available, host processor 170 proceeds to steps 300 et seq. of FIG. 3 to select an agent to service the contact. If a suitable agent is not available, host processor 170 enqueues the contact in a corresponding one of its contact queues 184, at step 214. CTI adjunct 160 is done with the contact until a suitable agent becomes available, as indicated at step 216.

Returning to step 210, if the contact is a call, host processor 170 enqueues it in the call queue 121'–129' that corresponds to the call's needed skill, at step 220. Conventionally, the call would not be enqueued in call queues 120 of ACD 101. According to the invention, however, if the contact is a call, host processor 170 directs processor 105 of ACD system 101 to route the call to a selected queuing vector 140, at step 222. In response, processor 105 flags the call as being under control of an external host, at step 224, and routes the call to the selected queuing vector 140, at step 226. Queuing vector 140 enqueues the call as an ACD call in the one call queue 121–129 that corresponds to the call queue 121'–129' in which the call has been enqueued in CTI adjunct 160, at step 220, and ACD system 101 does so, at step 228. This advantageously makes the call accessible to ACD features 145, which proceed to provide the same call treatment, particularly ACD call-delay features, at step 230, that ACD system 101 provides to enqueued ACD calls when it is operating in stand-alone mode without CTI adjunct 160. This also exposes the call to MIS 110 and enables MIS to collect data concerning managing of the call by ACD system 101. MIS 110 provides measurements for agents' voice activities and also assists in forecasting and scheduling. Because the call is flagged in call queues 120 as an ACD call that is being controlled by an external host, ACD system 101 refrains from dequeuing and assigning the call to an available agent unless caused to do so by host processor 170. (in contrast, ACD system 101 may dequeue calls that are not designated as being controlled by host processor 170 and send them for servicing to selected ACD agents, independently of and without being caused to do so by host processor 170). Processor 105 of ACD system also notifies CTI adjunct 160 that the call has been enqueued in call queues 120, at step 232.

Alternatively, CTI adjunct 160 dispenses with call queues 120 and host processor 170 does not enqueue calls on CTI adjunct 160 and keeps track of the calls via CTI link 161.

Host processor 170 decides what work should be serviced by what resource at what time. Upon receipt of the notification that the call has been enqueued on ACD system 101, at step 234, on the basis of its analysis of the call that was performed at step 208, host processor 170 checks the appropriate one of agent queues 130 to determine if a suitable agent 106–108 is available to service the call, at step 236. If a suitable agent is not available, CTI adjunct 160 is done with the call until a suitable agent becomes available, as indicated at step 238. But if it is determined at step 236 that a suitable agent is available to service the call, host processor 170 proceeds to steps 300 et seq. of FIG. 3 to select an agent to service the call.

Figure 2:
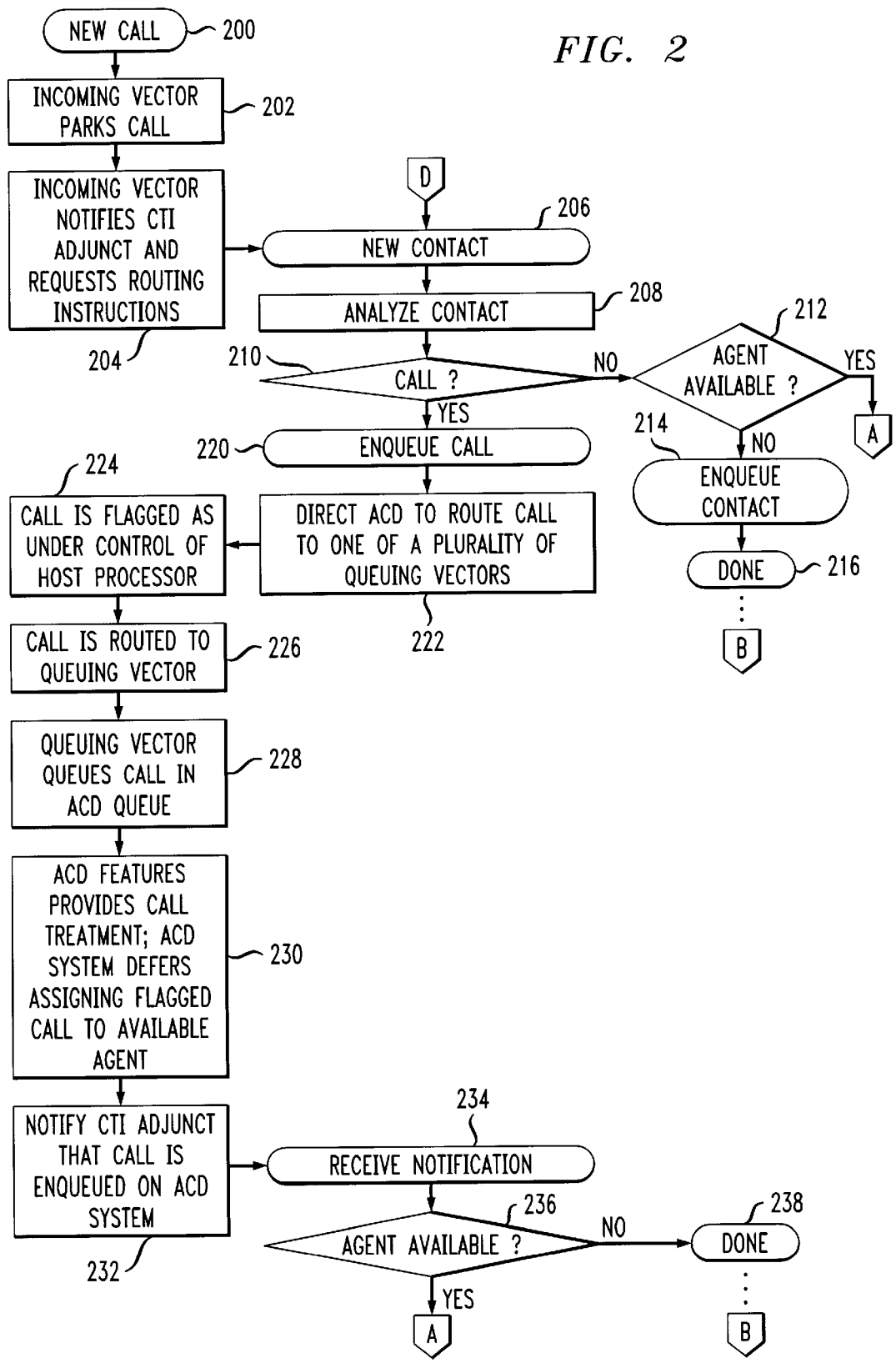
FIGS. 2–3 are a flow diagram of operation of the multi-media contact center of FIG. 1 in response to a contact becoming available for servicing.
Figure 3:
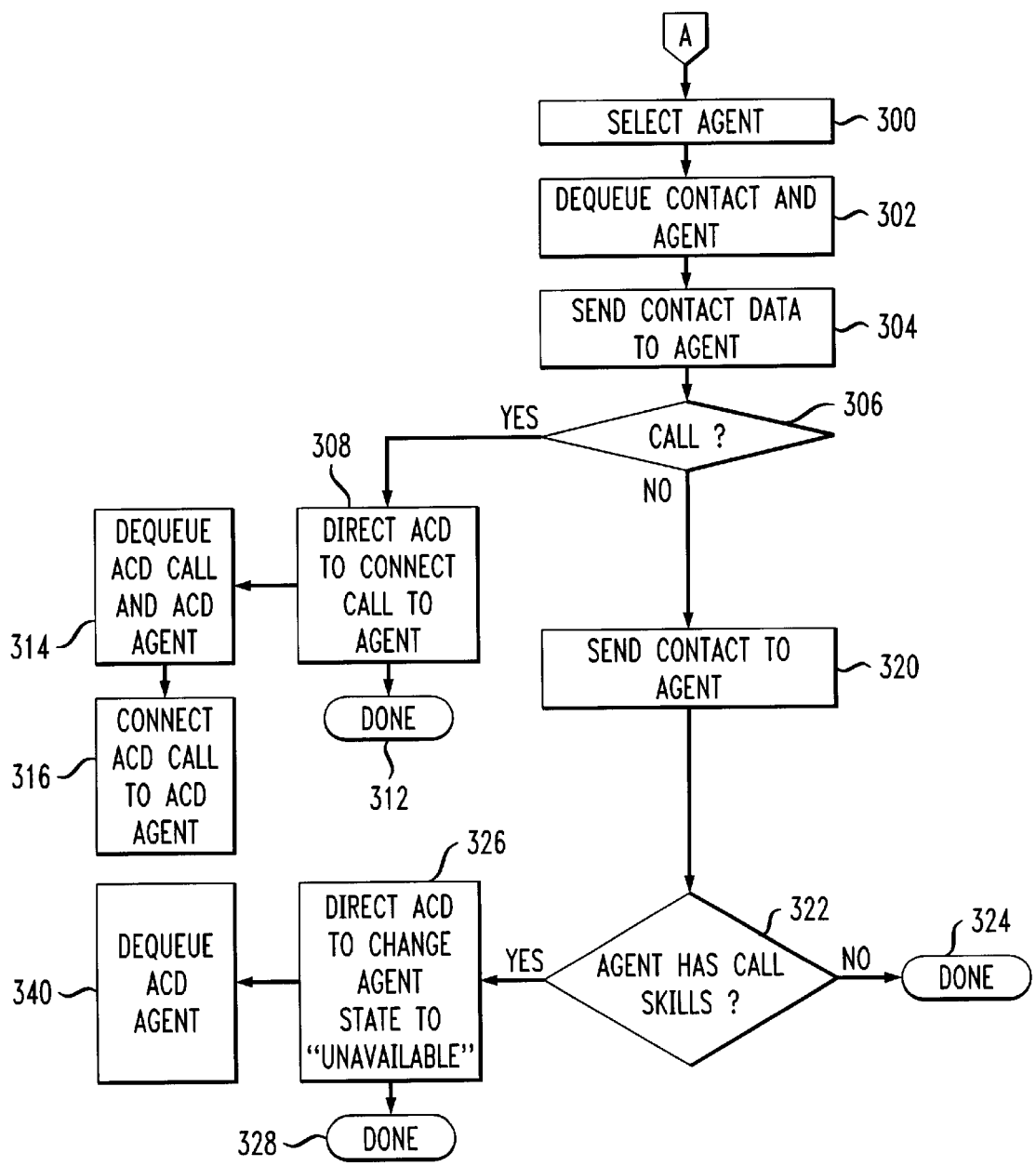
Figure 4:
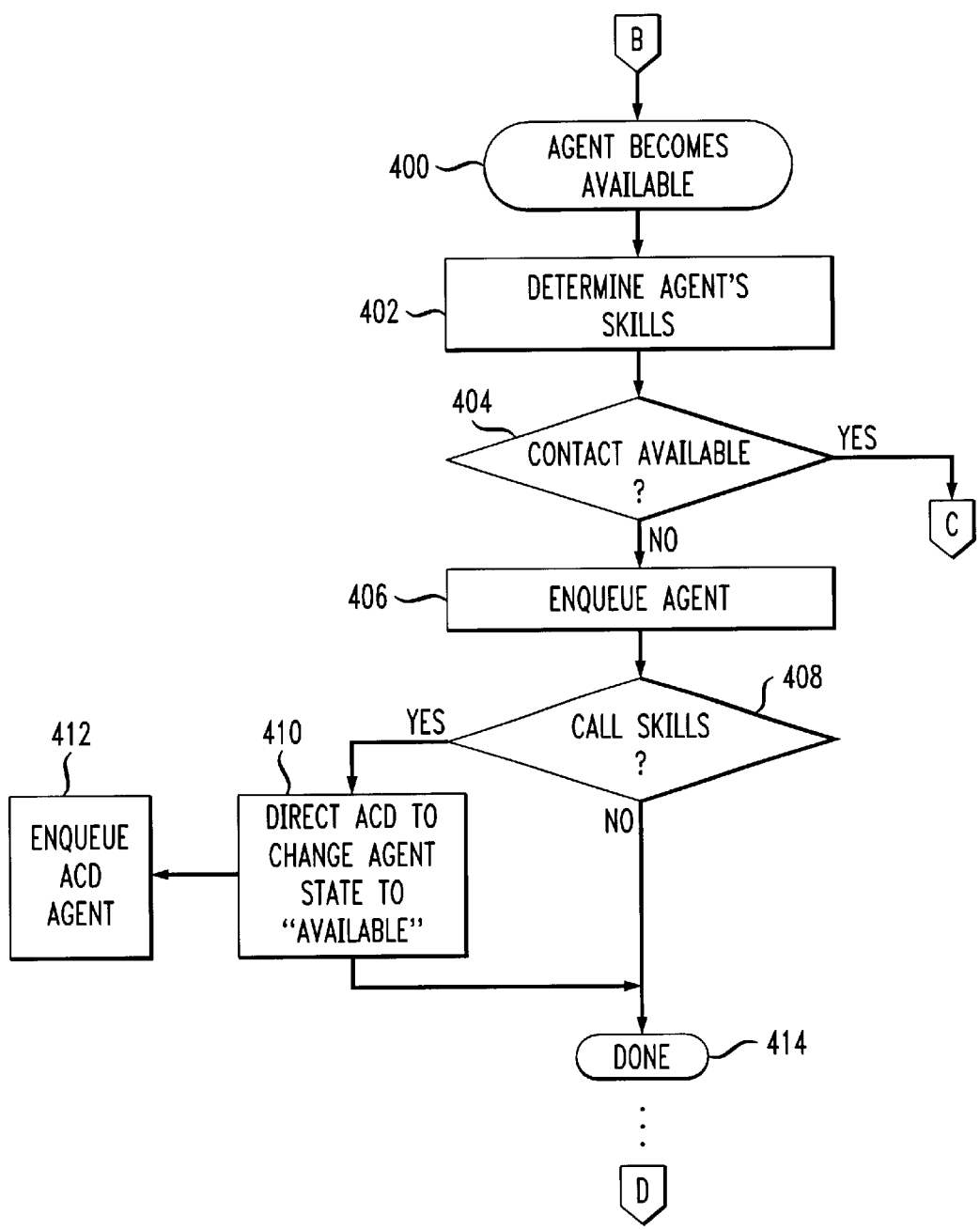
FIGS. 4–5 are a flow diagram of operation of the multi-media contact center of FIG. 1 in response to an agent becoming available to service a contact.

Step 300 of FIG. 3 is accessed from step 212 or step 236 of FIG. 2. At step 300, host processor 170 selects an available one of the suitable agents 102–104. Host processor 170 dequeues the selected agent from any agent queues 185 that the agent is enqueued on, and dequeues the contact that is to be serviced by the agent if it is enqueued, at step 302. Host processor 170 then retrieves data relating to the contact (e.g., to the caller) from database 180 and sends it to the selected agent, at step 304. If the contact is a call 168, as determined at step 306, host processor 170 directs ACD system 101 via CTI link 161 to connect the call to agent position 102–104 of the selected agent, at step 308. CTI adjunct 160 is then done with the contact for the time being, as indicated at step 312. In response to the directive, processor 105 of ACD system 101 would conventionally route a parked call to an agent extension. According to the invention, however, processor 105 dequeues the ACD call from ACD call queues 120 and dequeues the selected ACD agent from ACD agent queues 130, at step 314, and connects the ACD call to the selected ACD agent's position 102–104 to cause the selected ACD agent to answer the call. This results in ACD features behavior and MIS metrics for the call and agent that conform to those provided conventionally to ACD calls and ACD agents by ACD system 101.

Returning to step 306, if the contact that is assigned to the selected agent for servicing is not a call, host processor 170 sends the contact to the selected agent for servicing, at step 320. Conventionally, the agent would not be enqueued in agent queues 130. According to the invention, however, if an agent 106–108 has any call skills, he or she is enqueued as an ACD agent in agent queues 130 as well. Therefore, if the selected agent has any call skills (i.e., if the selected agent is enqueued in any voice (V) skill agent queues 130'), as determined at step 322, host processor 170 directs ACD system 101 via CTI link 161 to change the agent's state to "unavailable", at step 326. In response, processor 105 of ACD system 101 dequeues the agent from agent queues 130, at step 340. Following step 326, or step 322 if the agent does not have any call skills, host processor 170 is done with the contact for the time being, as indicated at steps 328 and 324, respectively.

Alternatively, CTI adjunct 160 dispenses with agent queues 130' and host processor 170 does not enqueue agents on CTI adjunct 160 for voice skills. Host processor 170 then keeps track of the agents for voice skills via CTI link 161.

An agent 106–108 becomes available to service contacts either by logging into CTI adjunct 160 or by becoming idle upon having completed servicing a contact. When an agent 106–108 becomes available, at step 400 of FIG. 4, host processor 170 determines (looks up) the agent's skills, at step 402, and then examines the corresponding contact queues 184 to determine if a contact 162–168 is available for being serviced by the agent, at step 404. If a suitable contact is not available, host processor 170 enqueues the agent in the ones of agent queues 185 that correspond to the agent's skills, at step 406. Normally, an agent would not be enqueued in agent queues 130 of ACD system 101 because CTI adjunct 160 and not ACD system 101 is in control of managing agents, and agent and call selector 150 is turned off. According to the invention, however, if the agent has any voice (V) skills (i.e., has been enqueued in any of agent queues 130'), as determined at step 408, host processor 170 directs ACD system 101 via CTI link 161 to change the agent's state to "available", at step 410, and in response processor 105 of ACD system 101 enqueues the agent as an ACD agent in corresponding agent queues 130, at step 412. This makes the availability of the agent known to ACD features 145 and MIS 110 and therefore allows them to take the agent's existence into account in their operations. Following step 408 or 410, CTI adjunct 160 is done with the agent for the time being, as indicated at step 414.

Figure 5:
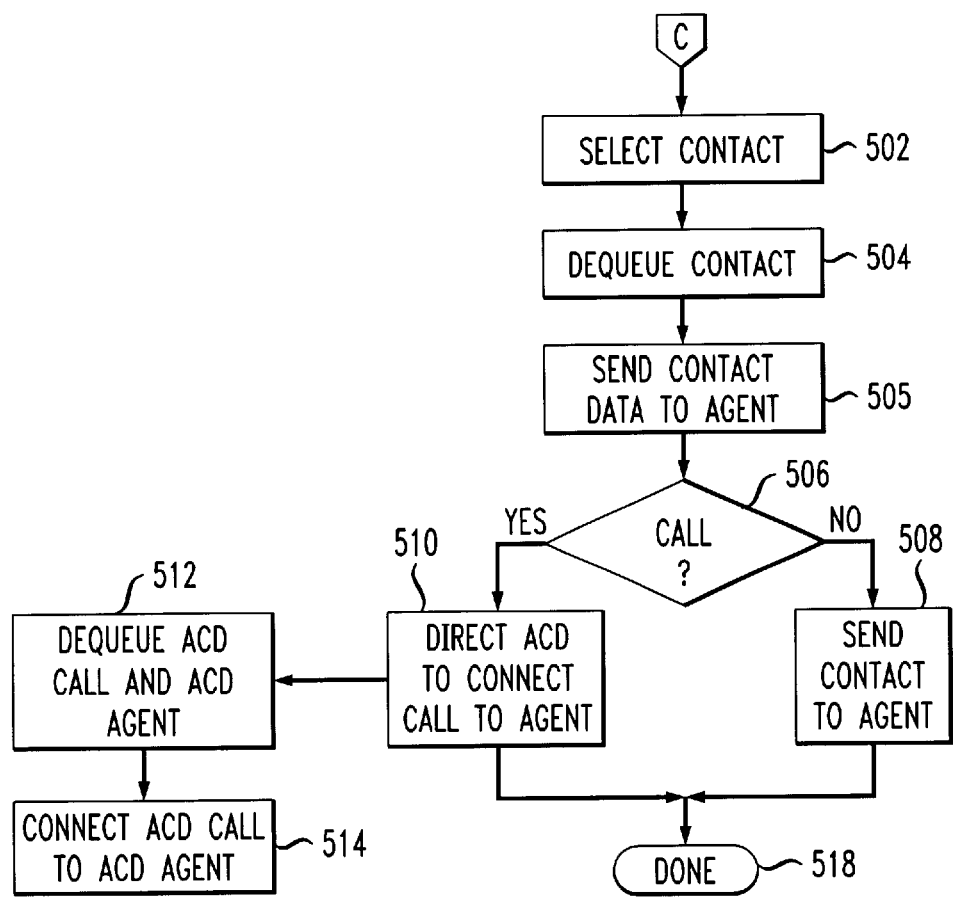

Returning to step 404, if it is there determined that a suitable contact is available for being serviced by the available agent, host processor 170 selects a contact from among the suitable contacts that are enqueued in contact queues 184, at step 502 of FIG. 5, and dequeues the selected contact, at step 504. Host processor 170 then retrieves data relating to the contact (e.g., to the caller) from database 180 and sends it to terminal 107 of the agent who is servicing the call via transmission medium 109, at step 505. If the selected contact is not a call, as determined at step 506, host processor 170 sends the contact to agent position 102–104 of the available agent 106–108 for servicing, at step 508. If the selected contact is a call, as determined at step 506, host processor 170 directs processor 105 of ACD system 101 to connect the selected call to the available agent 106–108, at step 510, via a "redirect call from queue" message. Conventionally, the call would not be enqueued in call queues 120, and so processor 105 would merely connect the parked call to the agent extension as directed, at step 514. According to the invention, however, the call is enqueued as an ACD call in call queues 120, and so processor 105 dequeues the call from call queues 120, at step 512, and then connects it as an ACD call to the agent to cause the agent to answer and service the call, at step 514. Processor 105 treats the "redirect call from queue" message not as a request to route to an extension but as an answer from ACD queue. Consequently all ACD and MIS functionality downstream will treat and measure this call like any standard ACD call. I.e., MIS messaging statistics, zip-tone, RONA, etc., follow. The agent having been provided with a contact to serve at step 508 or 510, CTI adjunct 160 is done with the contact for the time being, as indicated at step 518.

Another advantage provided by the above-described arrangement is that it enables calls to be handled in the system of FIG. 1 even when host processor 170 is no longer able to control the calls because of a system or link failure. When any failure is detected that would prevent host processor 170 from properly controlling voice calls on ACD system 101, ACD system 101 takes over control of all calls. CTI service failure may occur because of problems with either CTI adjunct 160 or CTI link 161. If the CTI and work-allocation functions are supported on different processors, this can also occur because of problems with work-allocation processors or the links between those processors and CTI adjunct 160. ACD system 101 may detect such service failures on its own, or may be informed of a service failure by means of a CTI message. When failure of CTI service is detected, host processor 170 stops delivering work of any kind to ACD agents, and ACD system 101 reverts to its conventional, stand-alone ACD, operation with call vector 140 and agent and call selector 150 active and responsible for enqueuing calls and ACD agents and assigning and delivering calls to ACD agents for servicing. When CTI service is restored, CTI adjunct 160 does not immediately assume control of call delivery or of assignment of other work to agents, because there may be many calls enqueued in ACD system 101 that are unknown to CTI adjunct 160 because they have arrived while CTI adjunct 160 was out-of-service. Therefore, when CTI service is restored, the system initially goes into a "recovery" mode of operation. In this mode, CTI adjunct 160 resumes control of any newly-arriving calls, but allows ACD system 101 to continue to deliver enqueued calls to agents until there are no calls that the CTI adjunct 160 does not know about in a call queue 120. At that point, ACD system 101 stops delivering calls to agents from that call queue and notifies CTI adjunct 160 that it may resume control of call delivery and other work for that skill (the skill that corresponds to the subject call queue). When all call queues 120 have been purged of calls unknown to CTI adjunct 160, normal operation of the system of FIG. 1 resumes.

Throughout the failover and recovery periods, host processor 170 may continue assigning non-call work to agents who are not controlled by ACD system 101.

Figure 6:
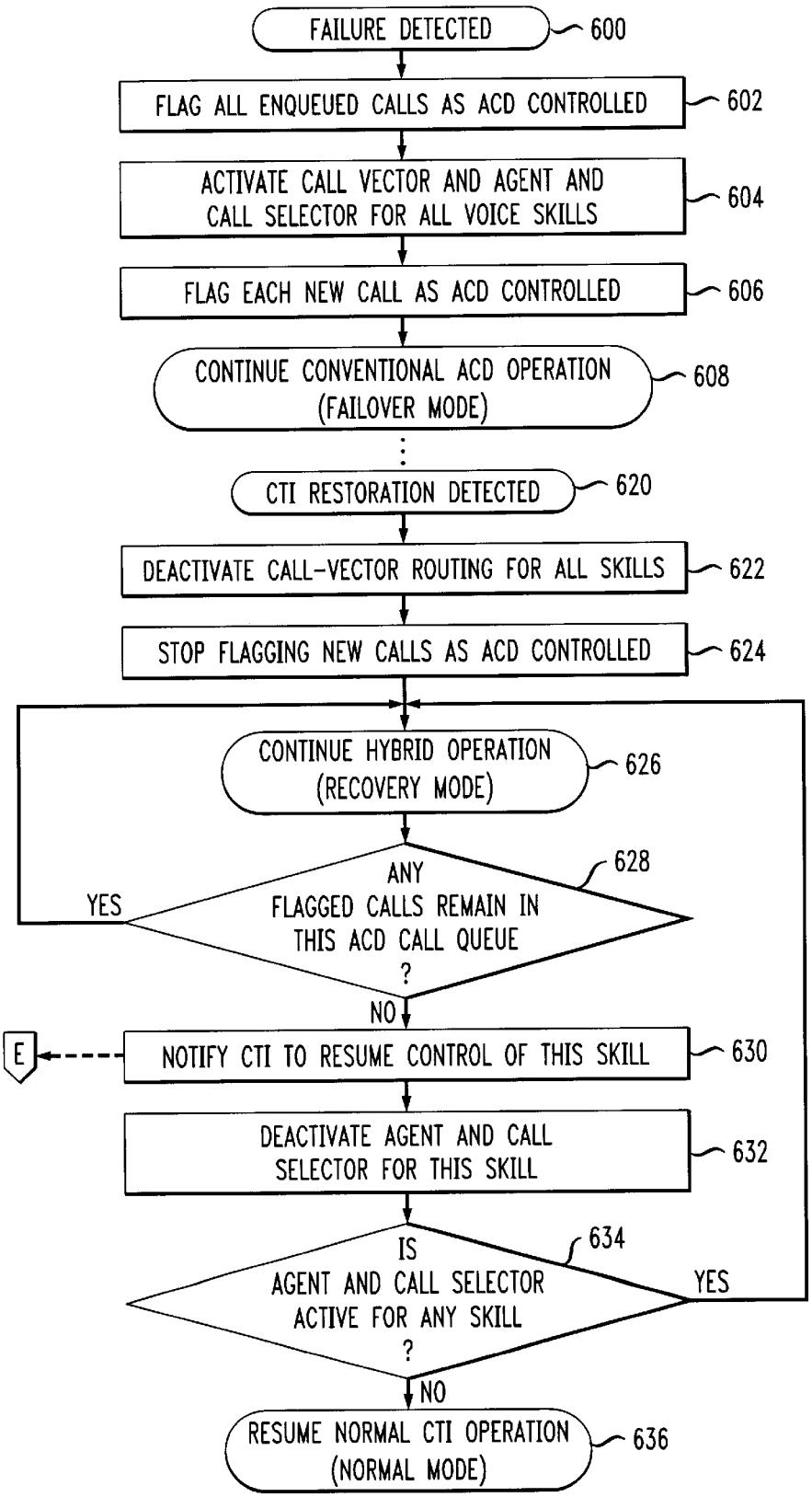
FIG. 6 is a flow diagram of operations of the ACD system of the contact center of FIG. 1 during CTI failure and recovery.
Figure 7:
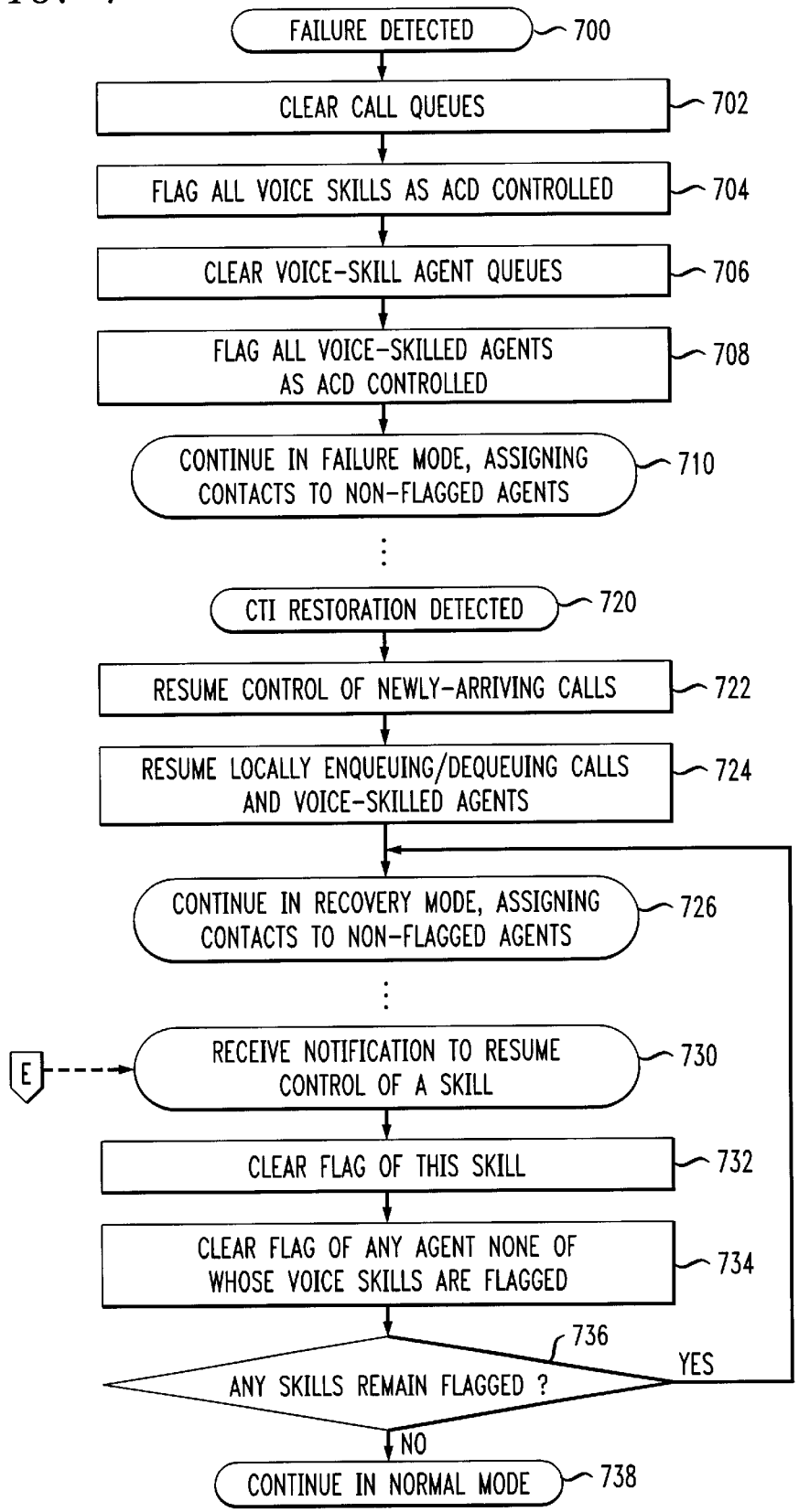
FIG. 7 is a flow diagram of operations of the CTI adjunct of the contact center of FIG. 1 during ACD failure and recovery.

The failure and recovery operation of ACD system 101 is shown in FIG. 6, and the failure and recovery operation of CTI adjunct 160 is shown in FIG. 7. The occurrence of a failure usually manifests itself as the loss of communications between ACD system 101 and CTI adjunct 160. This can be due to failure of CTI adjunct 160 and/or failure of CTI link 161. If the work-allocation functions are performed on a separate processor, this can also be due to failure of the work-allocation system and/or the link between it and CTI adjunct 160. When processor 105 of ACD system 101 detects or is informed of any failure that prevents host processor 170 from controlling calls, at step 600 of FIG. 6, it flags each call that is presently enqueued in call queues 120 as "ACD controlled", at step 602. Processor 105 then activates call vector 140 and agent and call selector 150 for all ACD skills, at step 604, thereby restoring conventional, stand-alone ACD, operation of ACD system 101, at step 608. However, processor 105 flags each new call arriving at ACD system 101 with the "ACD controlled" flag, at step 606.

The failure detected by ACD system 101 at step 600 may have just been a failure of CTI link 161 and not of CTI adjunct 160. In that case, host processor 170 of CTI adjunct 160 is active and detects a failure that prevents it from being able to control calls at ACD system 101, at step 700 of FIG. 7. In response, host processor 170 clears its call queues 120', at step 702, flags each voice (V) skill as "ACD controlled", at step 704, clears its voice-skilled agent queues 130', at step 706, and flags each agent who has a voice skill as "ACD controlled", at step 708. CTI adjunct 160 then continues to operate in "failover" mode, wherein it assigns contacts (i.e., contacts from non-flagged-skill contact queues) to only non-flagged agents, at step 710.

Returning to FIG. 6, when processor 105 of ACD system 101 detects restoration of CTI adjunct 160 (which may merely have involved restoration of CTI link 161), at step 620, it deactivates call-routing functionality of call vector 140, at step 622, giving control of newly-arriving calls back to CTI adjunct 160. Processor 105 also stops flagging new calls as "ACD controlled", at step 624, and then continues to operate in a hybrid mode wherein CTI adjunct 160 controls enqueuing of new calls in call queues 120 but ACD system 101 controls allocation and delivery of ACD-controlled calls from call queues 120 to agents, at step 626. Whenever processor 105 allocates a call from a call queue 121–128 to an agent, it checks whether any calls that are flagged as "ACD controlled" remain in that ACD call queue, at step 628. If so, processor 105 merely returns to step 626; if not, processor 105 notifies CTI adjunct 160 to resume CTI control of this skill, at step 630, and deactivates agent and call selector 150 for this skill, at step 632. Processor 105 then checks whether agent and call selector 150 is still active for any skills, at step 634. If so, processor 105 returns to step 626; if not, processor 105 resumes normal CTI operation of ACD system 101 where call vector 140 and agent and call selector 150 are turned off for all skills and all calls are controlled by CTI adjunct 160, at step 636.

Returning to FIG. 7, when host processor 170 detects restoration of CTI service (which may merely have involved restoration of CTI link 161), at step 720, it resumes control of calls newly-arriving at ACD system 101, at step 722. This includes resuming to enqueue newly-arriving calls in its call queues 120' and resuming to enqueue and dequeue in and from agent queues 130' any voice-skilled agents who become newly enqueued or dequeued by ACD system 101 in and from agent queues 130, at step 724. Host processor 170 then continues to operate in a "recovery" mode, wherein—as in the failover mode—it assigns contacts to non-flagged agents.

When host processor 170 receives notification (see step 630) from ACD system 101 to resume control of a particular skill, at step 730, host processor 170 clears the "ACD controlled" flag of that skill, at step 732. Host processor 170 then compares the voice skills of each voice-skilled agent against the skill flags and clears the "ACD controlled" flag of each agent none of whose voice skills are flagged as "ACD controlled", at step 734. This returns the unflagged agent to the pool of agents who are controlled and allocated by CTI adjunct 160. If any skills remain flagged as "ACD controlled", as determined at step 736, host processor 170 returns to step 728; of no skills remain flagged as "ACD controlled", host processor 170 resumes normal CTI operation where CTI adjunct 160 controls and allocates all calls and agents of the system of FIG. 1, at step 738.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method of operating a contact center comprising an automatic call distribution (ACD) system and a host processor separate from the ACD system, comprising:

the host processor enqueuing a received contact in a contact queue of the host processor at least if the contact is not a call, and causing the ACD system to enqueue the received contact in a selected one of a plurality of call queues of the ACD system if the contact is a call;

in response to the causing to enqueue, the ACD system enqueuing the call as an ACD call in the selected one of its plurality of call queues;

the ACD system providing ACD features to the call;

the host processor dequeuing the contact and assigning the contact to an agent for servicing at least if the contact is not a call, and causing the ACD system to assign the contact to a selected one of a plurality of ACD agents if the contact is a call; and in response to the causing to assign, the ACD system dequeuing the call from the selected one of its call queues and sending the call for servicing to the selected one of the ACD agents.

2. The method of claim 1 further comprising:

the ACD system refraining from dequeuing and sending the call unless caused to do so by the host processor.

3. The method of claim 1 wherein:
the ACD system enqueuing comprises
    designating the call as being under control of the host processor;
the method further comprising:
    the ACD system refraining from dequeuing and sending any call designated as being under control of the host processor unless caused to do so by the host processor.

4. The method of claim 3 further comprising:
the ACD system dequeueing a call that is not designated as being under control of the host processor and sending the call for servicing to a selected one of the ACD agents independently of and without being caused to do so by the host processor.

5. The method of claim 1 wherein:
the ACD system dequeuing and sending comprises
    the ACD system causing the selected ACD agent to answer an ACD said call from an ACD said selected one of its call queues.

6. The method of claim 1 further comprising:
in response to the causing to assign, the ACD system dequeuing the selected ACD agent from agent queues of the ACD system.

7. The method of claim 1 further comprising:
the ACD agents logging in as ACD agents into the ACD system; and
in response, the ACD system providing ACD features to the logged-in ACD agents.

8. The method of claim 1 wherein:
providing ACD features to the call comprises
    a management information system of the ACD system monitoring the call as an ACD call.

9. The method of claim 1 wherein:
the host processor enqueuing a received contact comprises
    the host processor enqueuing the received contact in the contact queue of the host processor, and
    the host processor further causing the ACD system to enqueue the received contact in the selected one of the call queues of the ACD system if the contact is a call; and
the host processor dequeuing the contact comprises
    the host processor dequeuing the contact from the contact queue of the host processor,
    the host processor assigning the contact to the agent for servicing if the contact is not a call, and
    the host processor causing the ACD system to assign the contact to the selected ACD agent if the contact is a call.

10. The method of claim 1 further comprising:
the host processor enqueuing an agent in an agent queue of the host processor at least if the agent is not an ACD agent, and causing the ACD system to enqueue the agent in a selected agent queue of the ACD system if the agent is an ACD agent;
in response to the causing to enqueue, the ACD system enqueuing the agent as an ACD agent in the selected agent queue of the ACD system;
the ACD system providing ACD features to the agent;
the host processor dequeuing the agent and assigning the agent to service a contact at least if the agent is not an ACD agent, and causing the ACD system to assign the agent to service an ACD call if the agent is an ACD agent; and
in response to the causing to assign, the ACD system dequeuing the agent from the selected agent queue of the ACD system and sending an ACD call to the agent for servicing.

11. The method of claim 10 further comprising:
the host processor assigning an ACD agent to service a non-call contact, and causing the ACD system to dequeue the assigned ACD agent from agent queues of the ACD system.

12. The method of claim 10 wherein:
the ACD system providing ACD features to the agent comprises
    a management information system of the ACD system monitoring the agent as an ACD agent.

13. The method of claim 10 wherein:
the host processor enqueuing an agent comprises
    the host processor enqueuing the agent in the agent queue of the host processor, and
    the host processor further causing the ACD system to enqueue the agent in the selected agent queue of the ACD system if the agent is an ACD agent; and
the host processor dequeuing the agent comprises
    the host processor dequeuing the agent from the agent queue of the host processor,
    the host processor assigning the agent to service the contact if the agent is not an ACD agent, and
    the host processor causing the ACD system to assign the agent to service the ACD call if the agent is an ACD agent.

14. The method of claim 1 wherein:
the host processor enqueuing a received contact comprises
    the host processor determining a skill required for servicing the contact,
    the host processor enqueuing the contact in a contact queue of the host processor that corresponds to the determined skill, and
    if the contact is a call, the host processor causing the ACD system to also enqueue the received contact in a call queue of the ACD system that corresponds to the determined skill; and
the host processor dequeuing the contact comprises
    the host processor selecting an agent having the determined skill to service the contact,
    the host processor dequeuing the contact from the contact queue of the host processor,
    if the contact is not a call, the host processor assigning the contact to the selected agent for servicing, and
    if the contact is a call, the host processor causing the ACD system to assign the contact to the selected agent for servicing.

15. The method of claim 10 wherein:
the host processor enqueuing an agent comprises
    the host processor determining a skill possessed by the agent,
    the host processor enqueuing the agent in an agent queue of the host processor that corresponds to the determined skill, and
    if the possessed skill is a call-handling skill, the host processor causing the ACD system to also enqueue the agent in an agent queue of the ACD system that corresponds to the possessed call-handling skill; and
the host processor dequeuing the agent comprises
    the host processor selecting the agent to service a contact needing the skill,
    the host processor dequeuing the selected agent from the agent queue of the host processor, if the needed skill is not a call-handling skill, the host processor assigning the agent to service the contact, and if the needed skill is a call-handling skill, the host processor causing the ACD system to assign the agent to service the contact.

16. The method of claim 14 further comprising:

the host processor determining skills of an agent;

the host processor enqueuing the agent in each agent queue of the host processor that corresponds to the determined skills of the agent;

if the determined skills of the agent include call-handling skills, the host processor causing the ACD system to also enqueue the agent in each agent queue of the ACD system that corresponds to the determined call-handling skills of the agent;

in response to the directing to enqueue, the ACD system enqueuing the agent as an ACD agent in said each agent queue of the ACD system that corresponds to the determined call-handling skills of the agent;

the host processor selecting the agent to service a contact needing at least one of the determined skills of the agent;

the host processor dequeuing the agent from each agent queue of the host processor in which the agent is enqueued;

if the contact is not a call, the host processor assigning the contact to the agent for servicing;

if the contact is not a call and the agent has a call-handling skill, the host processor further causing the ACD to dequeue the agent from each agent queue of the ACD system in which the agent is enqueued;

in response to the causing to dequeue, the ACD system dequeuing the agent from said each agent queue of the ACD system that corresponds to the determined call-handling skills of the agent;

if the contact is a call, the host processor causing the ACD system to assign the call to the agent for servicing; and in response to the causing to assign, the ACD system dequeuing the agent from each agent queue of the ACD system that corresponds to the determined call-handling skills of the agent and assigning the call to the agent for servicing.

17. A contact center comprising:

a host processor separate from but connected to an automatic call distribution (ACD) system and having contact queues, the host processor for enqueuing a received contact in a contact queue at least if the contact is not a call, and causing the ACD system to enqueue the received contact in a selected one of the call queues if the contact is a call, the host processor further for dequeuing the contact and assigning the contact to an agent for servicing at least if the contact is not a call, and causing the ACD system to assign the contact to a selected one of a plurality of ACD agents if the contact is a call; and the ACD system, having a plurality of ACD call queues and means for providing ACD features to ACD calls, responsive to the causing to enqueue by enqueuing the call as an ACD call in the selected one of the call queues so that the providing means provide the ACD features to the call, and responsive to the causing to assign by dequeuing the call from the selected one of the call queues and sending the call to the selected one of the ACD agents for servicing.

18. The contact center of claim 17 wherein:

the ACD system refrains from dequeuing and sending the call unless caused to do so by the host processor.

19. The contact center of claim 17 wherein:

the ACD system is responsive to the causing to enqueue by designating the call as being under control of the host processor, and refrains from dequeuing and sending any call designated as being under control of the host processor unless caused to do so by the host processor.

20. The contact center of claim 17 wherein:

the ACD system is responsive to the causing to assign by causing the selected ACD agent to answer an ACD said call from an ACD said selected one of its call queues.

21. The contact center of claim 17 wherein:

the ACD system is responsive to the causing to assign by dequeuing the selected ACD agent from agent queues of the ACD system.

22. The contact center of claim 17 wherein:

the ACD system includes means for logging in the plurality of ACD agents and the means for providing provide ACD features to logged-in ACD agents.

23. The contact center of claim 17 wherein:

the ACD system includes an MIS system for monitoring ACD calls, including the call.

24. The contact center of claim 17 wherein:

the host processor includes
  means for enqueuing the received contact in a contact queue, and further for causing the ACD system to enqueue the received contact in the selected call queue if the contact is a call, and
  means for dequeuing the contact from the contact queue, and further for assigning the contact to the agent for servicing if the contact is not a call and directing the ACD system to assign the contact to the selected agent for servicing if the contact is a call.

25. The contact center of claim 17 wherein:

the ACD system has a plurality of ACD agent queues and provides ACD features to ACD agents;

the host processor includes agent queues, the host processor for enqueuing an agent in an agent queue at least if the agent is not an ACD agent and causing the ACD system to enqueue the agent in a selected agent queue if the agent is an ACD agent, the host processor further for dequeuing the agent and assigning the agent to service a contact at least if the agent is not an ACD agent and causing the ACD system to assign the agent to service a call if the agent is an ACD agent; and the ACD system further includes means responsive to the causing to enqueue by enqueuing the agent as an ACD agent in the selected one of the ACD agent queues so that the ACD system provides the ACD features to the agent, and responsive to the causing to assign by dequeuing the ACD agent from the selected one of the ACD agent queues and sending a call to the agent for servicing.

26. The contact center of claim 25 wherein:

the host processor is further for assigning an ACD agent to service a non-call contact and causing the ACD system to dequeue the assigned ACD agent from agent queues of the ACD system.

27. The contact center of claim 25 wherein:

the ACD system includes an MIS system for monitoring ACD agents, including the agent.

28. The contact center of claim 25 wherein:
the host processor includes
   means for enqueuing the agent in the agent queue, and further for causing the ACD system to enqueue the agent in the selected ACD agent queue if the agent is an ACD agent, and
   means for dequeuing the agent from the agent queue, and further for assigning the agent to service the contact if the agent is not an ACD agent and causing the ACD system to assign the agent to service the call if the agent is an ACD agent.

29. The contact center of claim 17 wherein:
the host processor includes
   means for determining a skill required for servicing the contact,
   means for enqueuing the contact in a contact queue that corresponds to the determined skill,
   means responsive to the contact being a call, for causing the ACD system to also enqueue the contact as an ACD call in a call queue of the ACD system that corresponds to the determined skill,
   means for selecting an agent having the determined skill to service the contact,
   means for dequeuing the contact from the contact queue,
   means responsive to the contact not being a call, for assigning the contact to the selected agent for servicing, and
   means responsive to the contact being a call, for causing the ACD system to assign the contact to the selected agent for servicing.

30. The contact center of claim 25 wherein:
the host processor includes
   means for determining a skill of the agent,
   means for enqueuing the agent in an agent queue that corresponds to the determined skill,
   means responsive to the determined skill being a call-handling skill, for causing the ACD system to also enqueue the agent as an ACD agent in an ACD agent queue that corresponds to the determined call-handling skill,
   means for selecting the agent to service a contact needing the determined skill,
   means for dequeuing the selected agent from the agent queue,
   means responsive to the needed skill not being a call-handling skill, for assigning the agent to service the contact, and
   means responsive to the needed skill being a call-handling skill, for causing the ACD system to assign the agent to service the contact.

31. The contact center of claim 29 wherein:
the host processor further includes
   means for determining skills of an agent,
   means for enqueuing the agent in each agent queue that corresponds to the determined skills of the agent,
   means responsive to the determined skills of the agent including call-handling skills, for causing the ACD system to also enqueue the agent in each ACD agent queue that corresponds to the determined call-handling skills of the agent,
   means for selecting the agent to service a contact needing at least one of the determined skills of the agent,
   means for dequeuing the agent from each agent queue in which the agent is enqueued,
   means responsive to the contact not being a call, for assigning the contact to the agent for servicing,
   means responsive to the contact not being a call and the agent having a call-handling skill, for causing the ACD to dequeue the agent from each ACD agent queue in which the agent is enqueued, and
   means responsive to the contact being a call, for causing the ACD system to assign the call to the agent for servicing; and
the ACD system includes
   means responsive to the causing to enqueue the agent, for enqueuing the agent as an ACD agent in said each agent queue of the ACD system that corresponds to the determined call-handling skills of the agent, and
   means responsive to the causing to dequeue or to assign the agent, for dequeuing the agent from each said agent queue of the ACD system that corresponds to the determined call-handling skills of the agent, and further responsive to the directing to assign the agent, for assigning the agent to the call for servicing.

32. A method of operating a host processor in a contact center comprising an automatic call distribution (ACD) system having a plurality of ACD call queues and for providing ACD features to ACD calls and the host processor being separate from the ACD system and having contact queues, comprising:
   the host processor enqueuing a received contact in a contact queue of the host processor at least if the contact is not a call, and causing the ACD system to enqueue the received contact in a selected one of a plurality of the ACD call queues of the ACD system if the contact is a call, to cause the ACD system to enqueue the call as an ACD call in the selected one of its call queues and provide ACD features to the call;
   the host processor dequeuing the contact from the contact queue of the host processor and assigning the contact to an agent for servicing at least if the contact is not a call, and if the contact is a call then causing the ACD system to dequeue the call from the selected one of its call queues to assign the call to a selected one of a plurality of ACD agents, and to send the call for servicing to the selected one of the ACD agents.

33. The method of claim 32 wherein the ACD system further has a plurality of ACD agent queues and provides ACD features to ACD agents, the method further comprising:
   the host processor enqueuing an agent in an agent queue of the host processor at least if the agent is not an ACD agent, and causing the ACD system to enqueue the agent in a selected ACD agent queue of the ACD system if the agent is an ACD agent, to cause the ACD system to enqueue the agent as an ACD agent in the selected one of its ACD agent queues and provide ACD features to the agent; and
   the host processor dequeuing the agent and assigning the agent to service a contact at least if the agent is not an ACD agent, and causing the ACD system to assign the agent to service a call if the agent is an ACD agent, to cause the ACD system to dequeue the agent from the selected ACD agent queue of the ACD system and send an ACD call to the agent for servicing.

34. An apparatus that performs the method of claim 32 or 33.

35. A computer-readable medium containing instructions which, when executed in a computer, cause the computer to perform the method of claim 32 or 33.

* * * * *